(12) United States Patent
Sorin et al.

(10) Patent No.: US 9,417,390 B2
(45) Date of Patent: Aug. 16, 2016

(54) MULTIMODE FIBER FOR MODULATABLE SOURCE

(75) Inventors: Wayne V Sorin, Mountain View, CA (US); Michael Renne Ty Tan, Menlo Park, CA (US); Shih-Yuan Wang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/342,098

(22) PCT Filed: Aug. 31, 2011

(86) PCT No.: PCT/US2011/050091
§ 371 (c)(1),
(2), (4) Date: Feb. 28, 2014

(87) PCT Pub. No.: WO2013/032474
PCT Pub. Date: Mar. 7, 2013

(65) Prior Publication Data
US 2014/0219606 A1    Aug. 7, 2014

(51) Int. Cl.
*G02B 6/26* (2006.01)
*G02B 6/42* (2006.01)
*G02B 6/028* (2006.01)

(52) U.S. Cl.
CPC .. *G02B 6/26* (2013.01); *G02B 6/42* (2013.01); *G02B 6/0288* (2013.01); *G02B 6/4215* (2013.01)

(58) Field of Classification Search
CPC ....................................................... G02B 6/00
USPC ........................................................ 385/27
See application file for complete search history.

(56) References Cited

U.S. PATENT DOCUMENTS

| 4,322,829 | A | * | 3/1982 | Davis, Jr. | G01V 1/181 359/900 |
| 4,723,828 | A | | 2/1988 | Garel-Jones et al. | |
| 5,093,879 | A | * | 3/1992 | Bregman | G02B 6/4249 250/227.11 |
| 6,075,588 | A | * | 6/2000 | Pinsukanjana | G01N 21/3103 356/325 |
| 6,185,346 | B1 | | 2/2001 | Asawa et al. | |
| 6,324,326 | B1 | * | 11/2001 | Dejneka | G02B 6/1228 359/341.1 |
| 6,487,338 | B2 | | 11/2002 | Asawa et al. | |
| 6,556,329 | B1 | | 4/2003 | Simcoe et al. | |
| 6,655,853 | B1 | * | 12/2003 | Yap | G02B 6/4214 385/14 |

(Continued)

FOREIGN PATENT DOCUMENTS

| CN | 1219678 A | 6/1999 |
| CN | 1387626 A | 12/2002 |

(Continued)

OTHER PUBLICATIONS

International Search Report and Written Opinion, International Application No. PCT/US2011/050091, Date of Mailing: Mar. 19, 2012, pp. 1-10.

(Continued)

*Primary Examiner* — Kaveh C Kianni
(74) *Attorney, Agent, or Firm* — Hewlett Packard Enterprise Patent Department (57) ABSTRACT

A modulatable source is to generate a signal. A multi-mode fiber is to propagate the signal. The fiber is associated with a fiber d*NA, corresponding to a product of a fiber diameter (d) and a fiber numerical aperture (NA), substantially between 1 micron radian and 4 micron radian. A receiver is to receive the propagated signal.

15 Claims, 9 Drawing Sheets (56) References Cited

U.S. PATENT DOCUMENTS

| | | | |
|---|---|---|---|
| 6,865,317 B2* | 3/2005 | Vahala | B23K 26/0823 385/27 |
| 6,876,805 B2 | 4/2005 | Wang | |
| 6,885,802 B2 | 4/2005 | Oliveti et al. | |
| 7,346,237 B2* | 3/2008 | Matsumura | G02B 6/32 385/34 |
| 7,415,175 B2 | 8/2008 | Deliwala | |
| 7,509,004 B2 | 3/2009 | Coleman | |
| 8,055,109 B2 | 11/2011 | Dong et al. | |
| 8,748,797 B1* | 6/2014 | Decker | H03F 3/08 250/214 R |
| 2003/0201462 A1* | 10/2003 | Pommer | G02B 6/4201 257/200 |
| 2004/0013437 A1* | 1/2004 | Wiltsey | G02B 6/2804 398/183 |
| 2004/0258354 A1* | 12/2004 | Sekiya | G02B 6/32 385/35 |
| 2005/0063712 A1 | 3/2005 | Rice et al. | |
| 2005/0105866 A1* | 5/2005 | Grudinin | B82Y 20/00 385/123 |
| 2008/0166094 A1 | 7/2008 | Bookbinder et al. | |
| 2008/0226298 A1 | 9/2008 | Fukuyama et al. | |
| 2008/0240663 A1* | 10/2008 | Dong | C03B 37/01211 385/125 |
| 2009/0028495 A1 | 1/2009 | Anrig et al. | |
| 2009/0052848 A1 | 2/2009 | Shimotakahara et al. | |
| 2009/0092365 A1 | 4/2009 | Donlagic | |
| 2010/0021170 A1 | 1/2010 | Lumineau et al. | |
| 2010/0028020 A1* | 2/2010 | Gholami | G01M 11/338 398/159 |
| 2010/0271689 A1 | 10/2010 | Jasapara | |
| 2011/0058250 A1 | 3/2011 | Liu et al. | |
| 2011/0088433 A1 | 4/2011 | Allegretto et al. | |
| 2012/0114289 A1* | 5/2012 | DeMeritt | G02B 6/4292 385/79 |
| 2013/0039626 A1* | 2/2013 | Bickham | G02B 6/0288 385/124 |
| 2014/0218738 A1* | 8/2014 | Bartoli | G01N 21/45 356/450 |

FOREIGN PATENT DOCUMENTS

| | | |
|---|---|---|
| CN | 101621349 A | 1/2010 |
| EP | 2056138 A1 | 5/2009 |
| JP | 11-095060 A1 | 4/1999 |
| WO | WO-2011046999 A1 | 4/2011 |

OTHER PUBLICATIONS

Gong, Y. et al., Bandwidth Enhanced Multimode Fiber with Multi-singlemode Cores, Mar. 25, 2007, Optical Society of America, <http://www.opticsinfobase.org/abstract.cfm?uri=NFOEC-2007-JWA1>, 3 pages.

Extended European Search Report received in EP Application No. 11871599.4, Jul. 21, 2015, 9 pages.

International Preliminary Report on Patentability received in PCT Application No. PCT/US2011/050091, Mar. 13, 2014, 8 pages.

Partial Supplementary European Search Report received in EP Application No. 11871599.4, Mar. 30, 2015, 5 pages.

* cited by examiner

MULTIMODE FIBER FOR MODULATABLE SOURCE

BACKGROUND

Optical fibers may be used for communication of signals. Single-Mode Fiber (SMF) may support extended propagation distances, but does not support multi-mode signals such as those generated by high-speed Vertical Cavity Surface Emitting Lasers (VCSELs) having high modulation rates. Multimode Fiber (MMF) can support multi-mode signals, but current MMF does not support propagation of signals over long distances at high modulation rates due to dispersion limiting propagation effects.

BRIEF DESCRIPTION OF THE DRAWINGS/FIGURES

The present examples will now be described with reference to the accompanying drawings. In the drawings, like reference numbers may indicate identical or functionally similar elements.

DETAILED DESCRIPTION

A multimode fiber (MMF) according to examples may be optimized for high-speed communication over long propagation distances. Communication may involve various optical sources, including lasers such as high-speed Vertical Cavity Surface Emitting Lasers (VCSELs) having high modulation rates and generating signals at wavelengths such as 780 nanometers (nm), 850 nm, 980 nm, 1060 nm, 1300 nm, and other wavelengths associated with signal sources. Example fiber systems described herein may provide signal propagation distances exceeding other MMFs by more than a factor of 10. Optimized MMFs according to examples may enable low-cost VCSEL-based communication at high modulation rates over long distances and also allow for reduced complexity in optical components associated with propagating and/or manipulating signals, optical components including receivers, demultiplexers, splitters, connectors, lenses, and the like.

Figure 1:
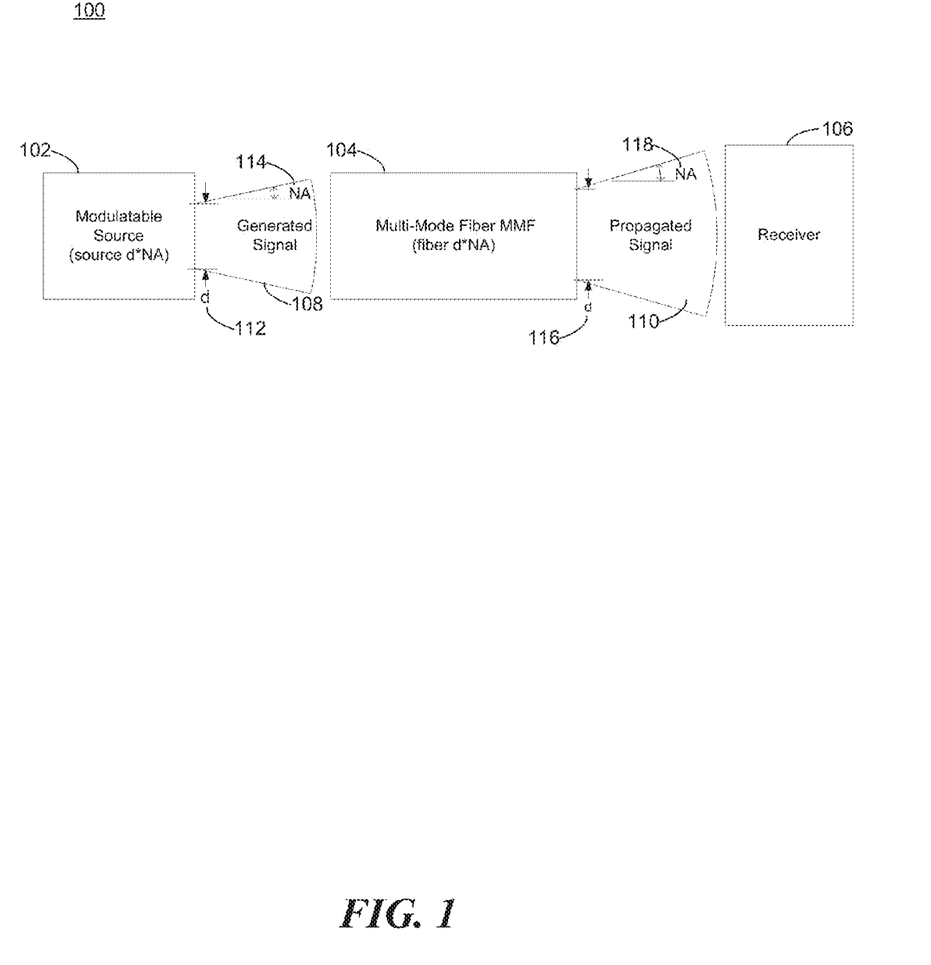
FIG. 1 is a block diagram of a multi-mode fiber system according to an example.

FIG. 1 is a block diagram of a multi-mode fiber system 100 according to an example. The system 100 may include a source 102 to generate a signal to be propagated by fiber 104 and received by receiver 106.

The source 102 may be modulatable, to modulate information to be transmitted via the generated signal 108. A source diameter 112 and a source numerical aperture 114 are associated with the source 102, and may be associated with a source d*NA, i.e., a product of the source diameter 112 and the source numerical aperture 114. The generated signal 108 is received by the fiber 104.

Source 102 may include lasers, such as Vertical Cavity Surface Emitting Lasers (VCSELs), edge emitting lasers, single-mode lasers, and other modulatable sources. VCSELs are spatially multimode sources capable of high modulation rates, and are cost effective compared to more expensive single-mode communication lasers that are used with Single Mode Fiber (SMF). However, VSCEL sources are not well-suited for use with SMF due to limitations of SMF.

SMF may have a relatively small diameter, such as 5 microns (with a numerical aperture of 0.1 radians and a step index profile, for example), according to known fiber standards such as the International standard ISO/IEC 11801 regarding general-purpose telecommunication cabling systems (structured cabling) and/or TIA-598C standards. Thus, SMF is not ideal for use with VCSEL sources, in part due to its inability to support the spatial multimode nature of VCSEL signals that may not be fully propagated by the SMF. Furthermore, SMF is associated with tighter alignment tolerance requirements, increasing costs and alignment difficulties for components associated with the SMF.

In contrast to SMF, MultiMode Fiber (MMF) may support multiple modes generated by a source. An example MMF is a Graded Index Fiber (GIF) having a 50 micron or a 62.5 micron core diameter (or greater), i.e., 50 GIF or 62.5 GIF MMF. However, 50 GIF and 62.5 GIF MMFs were standardized for use with Light Emitting Diode sources having lower modulation rates, before the advent of VCSEL sources having high modulation rates. Thus, capabilities of 50 GIF and 62.5 GIF MMF are limited by their relatively low bandwidth-length (BW*L) product when used with VCSEL sources. For example, a 50 GIF OM4 fiber (OM4 defined in TIA-492-AAAD, "Detail specification for 850-nm laser-optimized, 50-μm core diameter/125-μm cladding diameter class Ia graded-index multimode optical fibers of OM4 performance") may have a BW*L (bandwidth-length) product of about 4.7 GHz*km. Accordingly, at modulation and/or data rates of 25 Gbps, the propagation distance is limited to less than 200 meters. At data rates of 50 Gbps, the 50 GIF OM4 fiber would further limit propagation distances. 62.5 GIF MMF shows further reduced propagation distances compared to 50 GIF in view of the even larger core diameter associated with 62.5 GIF. Signals generated by VCSEL sources and used with 50 GIF/62.5 GIF MMF are affected by dispersion and other negative effects, limiting the distance and/or bandwidth of VCSEL signals used with 50 GIF/62.5 GIF MMF.

Fiber 104, in contrast to SMF and 50 GIF or 62.5 GIF MMF, may be associated with characteristics suitable for modulatable source 102. Thus, source 102 may be based on a VCSEL source having a high modulation rate (e.g., a rate of 10 Gbps and above). Characteristics of fiber 104 may include a MMF fiber having a fiber diameter 116 and a fiber numerical aperture 118. The fiber diameter 116 and fiber numerical aperture 118 provide a fiber d*NA product associated with propagating the generated signal 108 from the source 102 associated with a source d*NA product, even when the signal is modulated at high rates.

The fiber d*NA product may be adjusted to allow fiber 104 to use low-cost VCSEL sources, which are not used with SMF due the lack of multimode support in SMF. Fiber 104 may support high data modulation rates over extended distances, in view of the fiber d*NA product. For example, using the fiber 104, a VCSEL data rate of 50 Gbps may be supported over distances in excess of approximately 700 meters, in contrast to OM4 50 GIF that may be limited to a maximum distance of approximately 94 meters at 50 Gbps.

The fiber d*NA product associated with fiber 104 may save additional costs compared to SMF, because fiber 104 may allow for relaxed alignment tolerances in fiber couplings, connectors, and other components associated with the fiber 104 and/or fiber communication systems associated with fiber 104. Thus, components for use with fiber 104 may be produced more economically in view of relaxed tolerances, thereby multiplying savings over an entire multi-mode fiber system.

A d*NA product (source and/or fiber) of core diameter and Numerical Aperture may be a function of wavelength, and may be related to a number of spatial modes supported by the d*NA product. At 850 nm, an example VCSEL may generate a signal such that the source d*NA product may be (10 microns)*(0.22 radians)=2.2 micron-radian, associated with approximately 4 spatial one-dimensional (1D) modes (example VCSEL sources may be associated with source d*NA products of 2.0-2.2, and beyond). In contrast, at 850 nm, a standard 50 GIF may have a fiber d*NA product about 4.5 times larger at (50 microns)*(0.2 rad)=10 micron-radian, supporting approximately 18.5 modes. Thus, the 50 GIF supports spatial modes in excess of the approximately 4 spatial modes generated by the VCSEL source.

A BW*L product supported by a graded-index fiber is approximately proportional to the number of 1D-modes squared, which is related to the d*NA product. Accordingly, the BW*L product can be improved using the fiber 104 supporting a d*NA product corresponding to a lower number of modes. Thus, fiber 104 is not associated with dispersion issues and limited propagation distances as in the 50 GIF that supports excessive spatial modes. Thus, in contrast to the 50 GIF, fiber 104 may be designed as a graded index fiber having, for example, a core diameter of 25 microns (25 GIF) and a numerical aperture of 0.1 radians, i.e., a fiber d*NA product of 2.5 micron-radian associated with supporting approximately 4.6 modes at 850 nanometers. The fiber 104 having a d*NA product of 2.5 micron-radian, associated with approximately 4 spatial 1D modes, may support the 2.2 micron-radian d*NA product of the VCSEL source associated with approximately 4 spatial 1D modes, while providing additional alignment tolerances compared to SMF and increased propagation distances compared to 50 GIF.

Additionally, the BW*L product is proportional to a BitRate*Length product (BR*L product), which is proportional to NA as follows:

$$BR \cdot L \sim \frac{c}{n} \frac{1}{\Delta^2}$$

where c=the speed of light, n=a refractive index of the fiber, and $\Delta$ is expressed as follows:

$$\Delta \sim \frac{1}{2}\left(\frac{NA}{n}\right)^2$$

where n=the refractive index of the fiber. Thus, the BR*L product is proportional to the inverse of NA to the fourth power. Accordingly, decreasing NA by a factor of two may increase the BR*L product by a factor of greater than 10, corresponding to an increase in fiber propagation distance.

Receiver 106 is to receive the propagated signal 110 from the fiber 104. Receiver 106 is capable of detecting the modulatable source, e.g., compatible with the modulation rate of the modulatable source 102. Receiver 106 may include optical receivers capable of receiving the propagated signal 110 from the fiber 104 based on the fiber diameter 116 and fiber numerical aperture 118. Thus, system 100 may be used with photonics associated with communication and/or computing devices, including optical interconnects for fiber optic communication.

Thus, a system based on example fiber 104 (e.g., VCSEL-optimized graded-index MMF, i.e., V-MMF) may be mode-optimized for high-speed VCSELs and may support extended bandwidth-length products. A mode-optimized V-MMF may increase in the distance that a high-speed VCSEL signal can travel along a MMF fiber. The features of example systems enable greater flexibility in the design of data centers or other communications applications.

Figure 2:
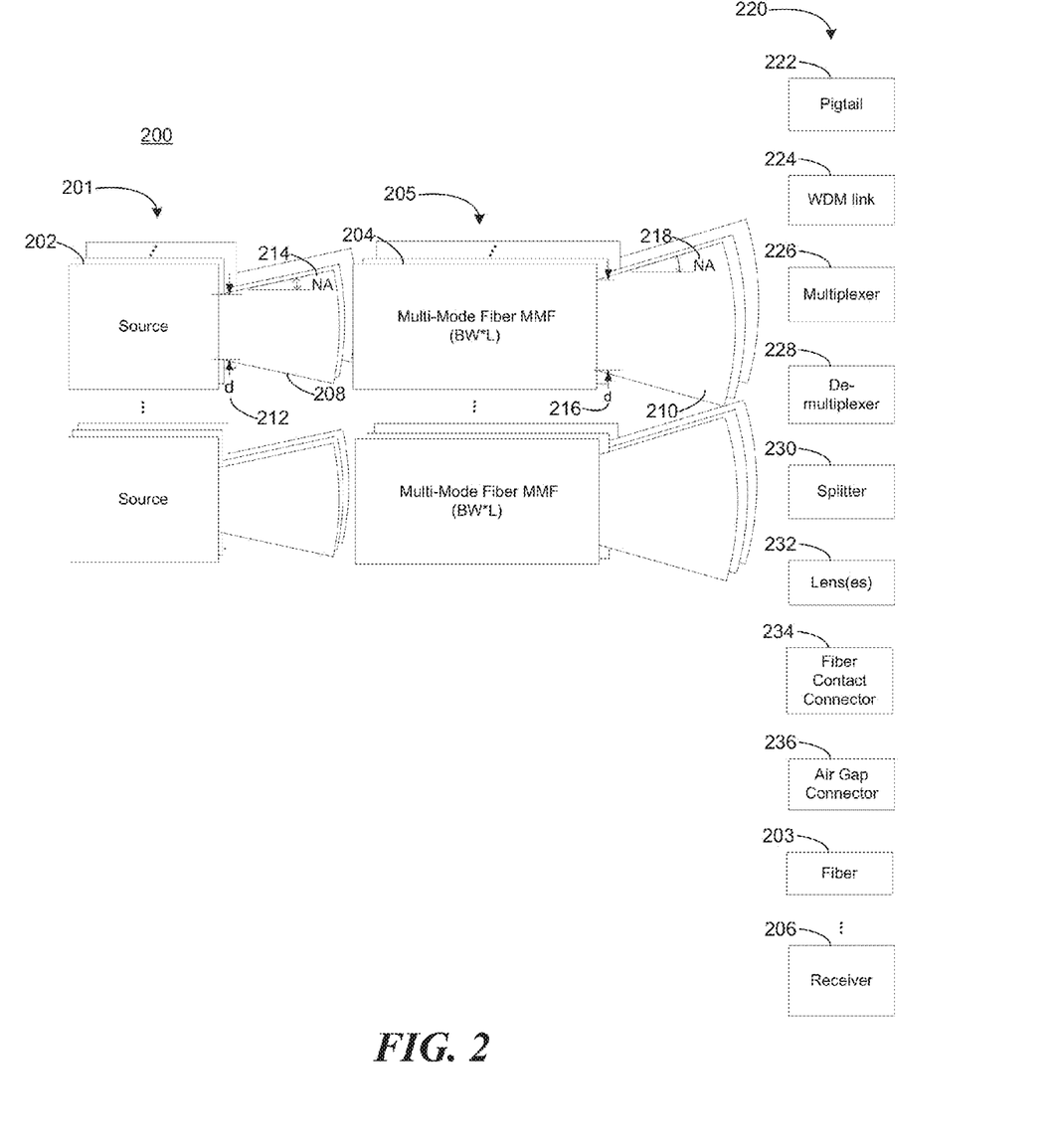
FIG. 2 is a block diagram of a multi-mode fiber system including a source array, a fiber array, and optical components according to an example.

FIG. 2 is a block diagram of a multi-mode fiber system 200 including a source array 201, a fiber array 204, and optical components 220 according to an example. Multiple sources 202 may provide multiple generated signals 208 to multiple fibers 204. Generated signals 208 may be associated with a source diameter 212 and a source numerical aperture 214. Fibers 204, which may be graded-index MMFs associated with BW*L products, may provide multiple propagated signals 210 to various optical components 220. Propagated signals 210 may be associated with a fiber diameter 216 and a fiber numerical aperture 218.

Optical components 220 may include pigtail components 222, Wavelength Division Multiplexing (WDM) link components 224, multiplexer components 226, demultiplexer components 228, splitter components 230, lens components 232, fiber contact connector components 234, air gap connector components 236, additional fiber 203, and receiver 206.

The fiber 204 is well suited for various optical components 220, in part due to supporting a lower d*NA product and corresponding number of spatial modes. Pigtailed components 222 may be easier to design when the input fiber 204 supports a lower number of modes, because greater tolerances may be associated with pigtail fibers of the pigtail component 222. Designs of splitter components 230, such as power splitters, mode splitters, polarization splitters, and/or wavelength splitters based on hollow metal waveguides (HM-WGs) or zigzag approaches, may be simplified for more economical component production and relaxed alignment tolerances. The features of fiber 204 may be optimized to enable simplified and lower cost wavelength demultiplexing using demultiplexer components 228, WDM systems using WDM link components 224, and other optical components 220 associated with VCSEL systems such as system 200. The fiber 204 may be associated with a beam divergence associated with enhanced ability to power split, collimate, and/or separate different wavelengths of the signal, suitable for use with the variety of optical components 220. A fiber d*NA of the fiber 204 enables optical components 220 to be made smaller and more economically, taking advantage of a collimating length for a given diameter lens associated with fiber 204.

In an example system, a fiber 204 may be used with a wavelength demultiplexer component 228 to carry signals from multiple sources. More specifically, multiple wavelength sources 202 may be connected to a wavelength multiplexer component 226 to multiplex the sources 202 into a multiplexed generated signal 208 propagated to a fiber 204. The fiber 204 may propagate the signal to a wavelength demultiplexer component 228 in communication with several detectors/receivers 206. Systems may similarly use splitters to split/combine signals.

Source array 201 may be connected to fiber array 205 based on one-dimensional (1D) or two-dimensional (2D) architectures, using various connectors associated with the chosen architecture. The source array 201 does not have to be the same architecture as the fiber array 205. A number of sources 202 used may differ from a number of fibers 204 used, e.g., by multiplexing the sources 202 and/or fibers 204. A cable may comprise multiple fibers that are connected to multiple sources, enabling high bandwidth communication via the cable.

Example array configurations include a 2D VCSEL array of sources 202 coupled into a 2D array of fibers 204. In an example, a 4×12 VCSEL array of sources 202 may use a different wavelength for each row. Zigzag coupling may couple the 4×12 source array 201 into a 1×12 fiber array 205 (e.g., using WDM to couple four-into-one).

Fiber connectors, such as air gap connector components 236 and fiber contact connector components 234, may be used to connect fibers 204. Fibers 204 may be optimized for use with fiber contact connector components 234 or air gap connector components 236.

Pigtail components 222 may be used, wherein a fiber is included with the pigtail component 222 for input and/or output connections. Example fibers 204 may be used as inputs into pigtail fibers, because the fiber d*NA product associated with fiber 204 provides collimation tolerance and enables scaled-down device dimensions for facilitating manipulation of signals/light. Thus, pigtail components 222 may operate with enhanced performance when used with fiber 204.

Additional benefits may be realized in view of the characteristics associated with the fiber d*NA product associated with fiber 204 as set forth above, including a VCSEL optimized multimode fiber 204 (V-MMF) that supports between 2 and 6 1D spatial modes in combination with VCSEL sources, using V-MMF with VCSELs operating at data rates of 10 Gbps or larger, using V-MMF in combination with one- or two-dimensional VCSEL arrays, using V-MMF with multiple fiber array connectors (fiber contact connectors and/or air-gap connectors using lenses), using V-MMF combined with WDM VCSEL links, using V-MMF with fiber pigtailed power splitting optical buses, and other applications.

Figure 3:
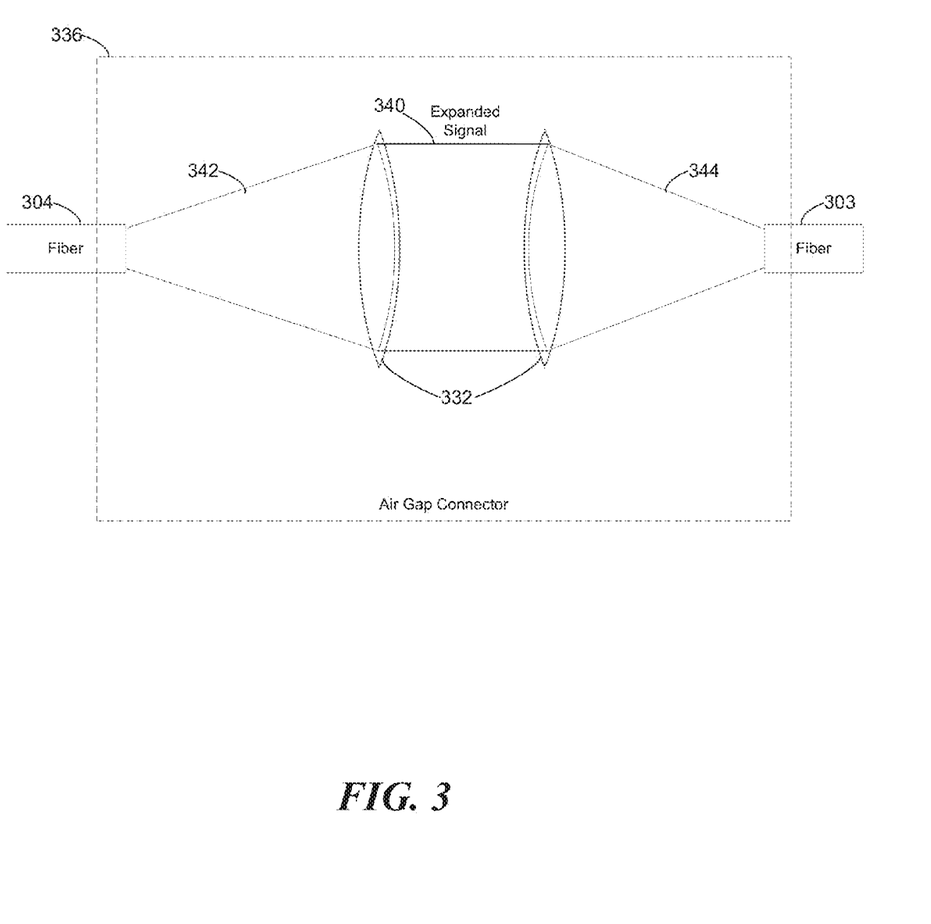
FIG. 3 is a block diagram of an air gap connector used with a multi-mode fiber according to an example.

FIG. 3 is a block diagram of an air gap connector 336 used with a multi-mode fiber 304 according to an example. Air gap connector 336 enables a signal to be sent through the air from fiber 304 to additional fiber 303 using lenses 332.

Fiber 304 propagates a signal, which emerges from fiber 304 as diverging signal 342. Lenses 332 receive the diverging signal 342, transmit the signal as an expanded signal 340, and send the signal to additional fiber 303 as a converging signal 344. Lenses 332 are separated by an air gap. Accordingly, two fibers may be connected without scratching or causing the lenses 332 to contact each other. The signal beam may be expanded, e.g., spreading out the beam from an approximately 25 micron core of the fiber to an expanded signal 340 sized at approximately 200 microns at lenses 332. The expanded signal 340 is resistant to dust or other particles that would otherwise attenuate the non-expanded signal, because the portion of expanded signal 340 attenuated by a dust particle is insignificant in view of the overall signal contained by the expansion.

A fiber (e.g., fiber 304 and/or additional fiber 303) may be terminated with an air gap connector due to the fiber d*NA characteristics enabling relaxed tolerances, such that each fiber may be terminated with an air gap connector and is not limited to mating/contact connectors. An air gap connector terminating a fiber may be connected to another air gap connector that is terminating another fiber. An array of fibers may be associated with an array of multiple lenses.

Air gap connectors 336 are well suited to dusty environments, such as backplane applications including a backplane of a computing system. A backplane of a computer is dusty, and ordinary mating/contact connectors are expensive to make and are impractical to operate successfully in dirty/dusty environments. Examples of fiber 304 are compatible with air gap connectors 336, which are more economical and more robust than mating/contact connectors in such applications.

Figure 4:
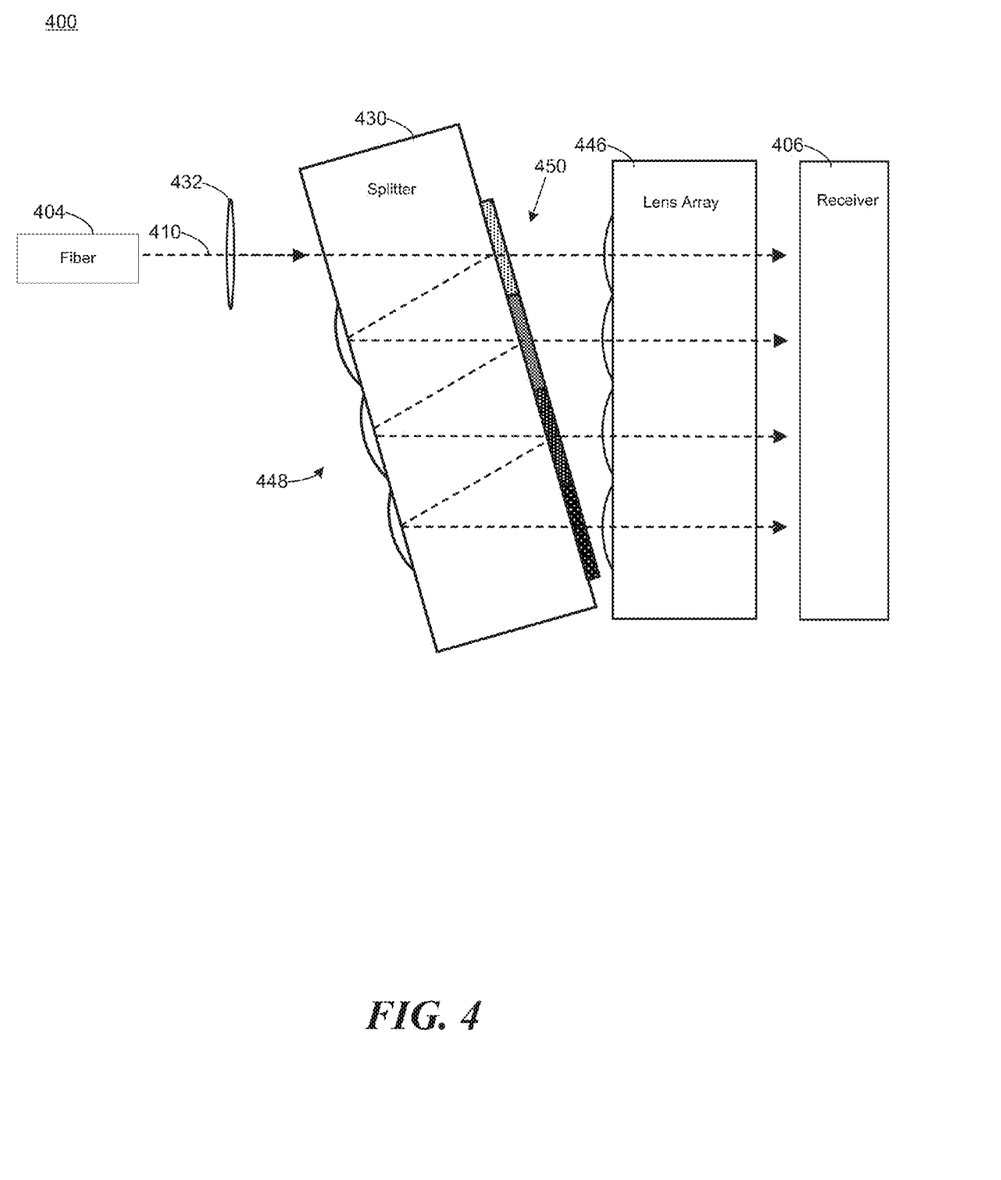
FIG. 4 is a block diagram of a multi-mode fiber system including optical components according to an example.

FIG. 4 is a block diagram of a multi-mode fiber system 400 including optical components according to an example. Fiber 404 provides propagated signal 410 that is passed to lens 432, splitter 430, lens array 446, and receiver 406.

Lens 432 may collimate the propagated signal 410 to be received by splitter 430. Splitter 430 may be a zigzag optical component receiving a signal from fiber 404. Fiber 404 may be a one-dimensional input fiber array and/or a single fiber carrying multiple wavelengths using WDM. The splitter 430 may be used for a WDM multiplexer/demultiplexer and/or a 1×N optical power splitter. The propagated signal 410 is shown traveling from the fiber 404 to the receiver 406. However, the optical components may be operated in reverse (e.g., multiple rows input into a single output row) whereby the receiver 406 is replaced with a component to provide multiple signals traveling toward the lens array 446 to be combined by the splitter 430 and received by the fiber 404.

The fiber d*NA product associated with fiber 404 allows for smaller and lower loss optical components, such that system 400 may have enhanced efficiency and tolerance. Splitter 430 includes selective mirrors 450 and collimating mirrors 448. The selective mirrors 450 may be wavelength selective, e.g., in the case of a WDM demultiplexer, and/or partially reflective, e.g., in the case of a 1×N power splitter. As illustrated, selective mirrors 450 transmit a selected range of wavelengths/power and reflect a selected range. The collimating mirrors 448 are curved reflecting mirrors to re-collimate the beam as travels through the splitter 430. The collimating mirrors 448 may compensate for beam divergence, e.g., caused by diffraction. The transmitted beams are passed to lens array 446, where the beams are focused for reception. For example, the beams from lens array 446 may be received by an array of additional fibers (not shown) or by receiver 406 (e.g., an array of receivers).

As a power splitter component, splitter 430 may split power to multiple different destinations (e.g., different fibers, lenses, receivers and/or other components). In contrast to the zigzag approach of the splitter 430, a hollow metal waveguide (HMWG), which may be a pigtailed component, may be used to collimate light to travel a greater distance and have a lower number of modes. Power in the signal may drop proportionally to how much the signal is split. The number of modes in each split of the signal may be maintained, along with the same proportion of power of each mode in each output, to avoid mode partition noise.

Figure 5:
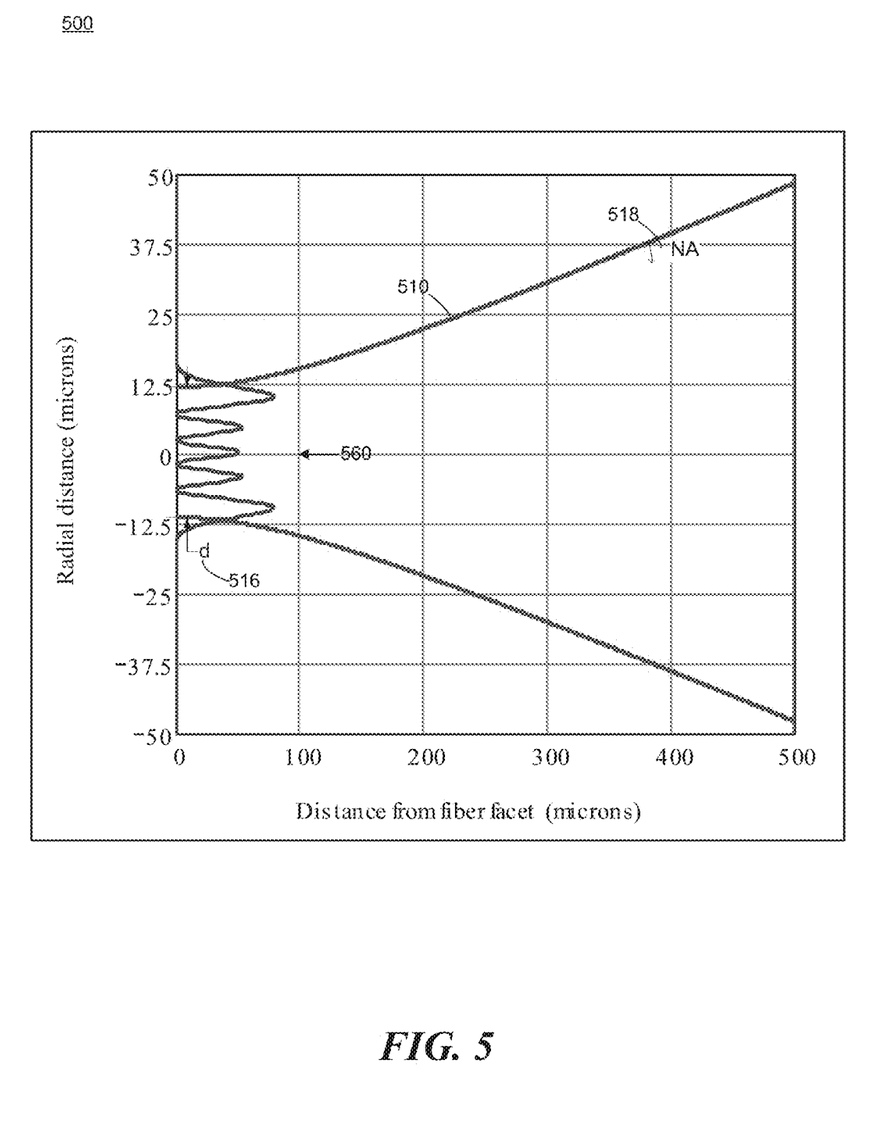
FIG. 5 is a chart of optical power as a function of distance of a multi-mode fiber according to an example.

FIG. 5 is a chart 500 of optical power as a function of distance from a multi-mode fiber according to an example. Propagated signal 510 is provided by the multi-mode fiber, and is associated with fiber diameter 516 and fiber numerical aperture 518.

As illustrated, the numerical aperture 518 is shown as a far-field divergence angle associated with propagated signal 510, i.e., at a distance from the fiber facet (the indicated distance measured along an axis of the fiber). The numerical aperture 518 corresponds to $NA_0$ where $NA_0$ is the numerical aperture at the center of the fiber where r=0.

The fiber also may be associated with modes 560 corresponding to a fiber d*NA product. Chart 500 shows the intensity pattern for the highest order (m=4) of the modes 560 upon leaving the fiber facet of the core of the fiber (e.g., 25 GIF in an example). The highest order mode diverges according to the curve of propagated signal 510, as the modes 560 propagate into free-space after leaving the fiber core. The maximum d*NA, i.e., a function of numerical aperture 518, is set by the value for the highest order mode of the graded-index fiber.

Figure 6:
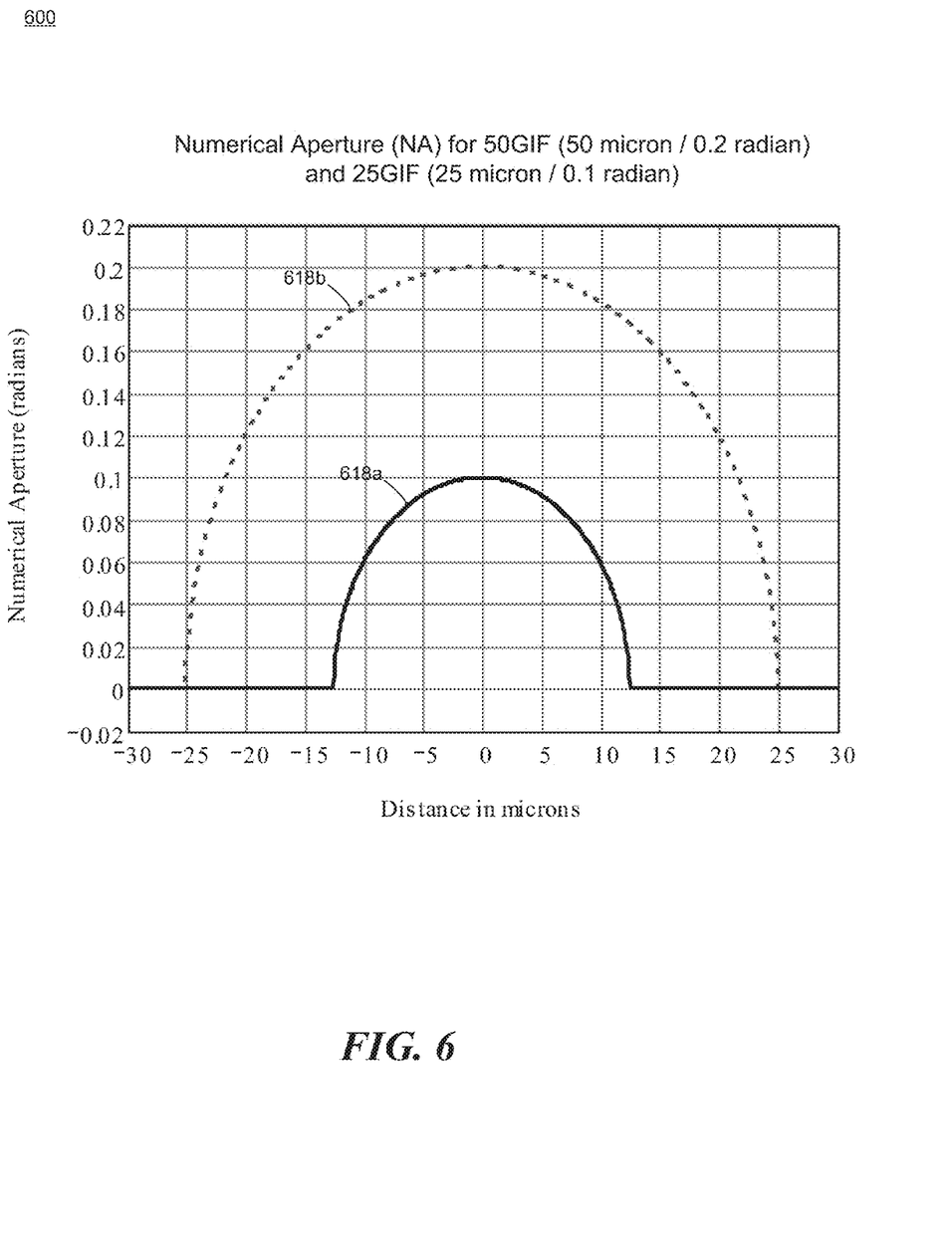
FIG. 6 is a chart of numerical aperture as a function of distance of a multi-mode fiber according to an example.

FIG. 6 is a chart 600 of numerical aperture as a function of distance of a graded-index multi-mode fiber according to an example. Distances are relative to a center of the core of the fiber. The solid inner curve, fiber numerical aperture 618a, corresponds to a core having a radius of 12.5 microns (diameter of 25 microns). The dashed outer curve, fiber numerical aperture 618b, corresponds to a core having a radius of 25 microns (diameter of 50 microns).

Numerical aperture may be expressed as a function of radius r, where r varies from zero (at the radial center of the fiber) to a (at the outer fixed radius of the fiber core, i.e., the a is diameter of the fiber core divided by 2). For fiber numerical aperture 618a, a=12.5 microns. For fiber numerical aperture 618b, a=25 microns. Numerical aperture at a given radius r also may be expressed as a function of $NA_0$ where $NA_0$ is the numerical aperture at the center of the fiber where r=0. Thus, NA(r) may be expressed as follows:

$$NA(r) \approx NA_o \sqrt{1 - \left(\frac{r}{a}\right)^2}$$

Numerical aperture is a quadratic value, as indicated in the expression above. At any radius from center of core, the numerical aperture may assume a different value. As illustrated in FIG. 6, $NA_0$ corresponds to a center of the fiber where r=0. Accordingly, $NA_0$ for fiber numerical aperture 618a corresponds to 0.1 radians. $NA_0$ for fiber numerical aperture 618b corresponds to 0.2 radians. The generically identified numerical aperture NA, in the expression for the fiber d*NA product and the source d*NA product, corresponds to $NA_0$ at the center of the fiber.

Figure 7:
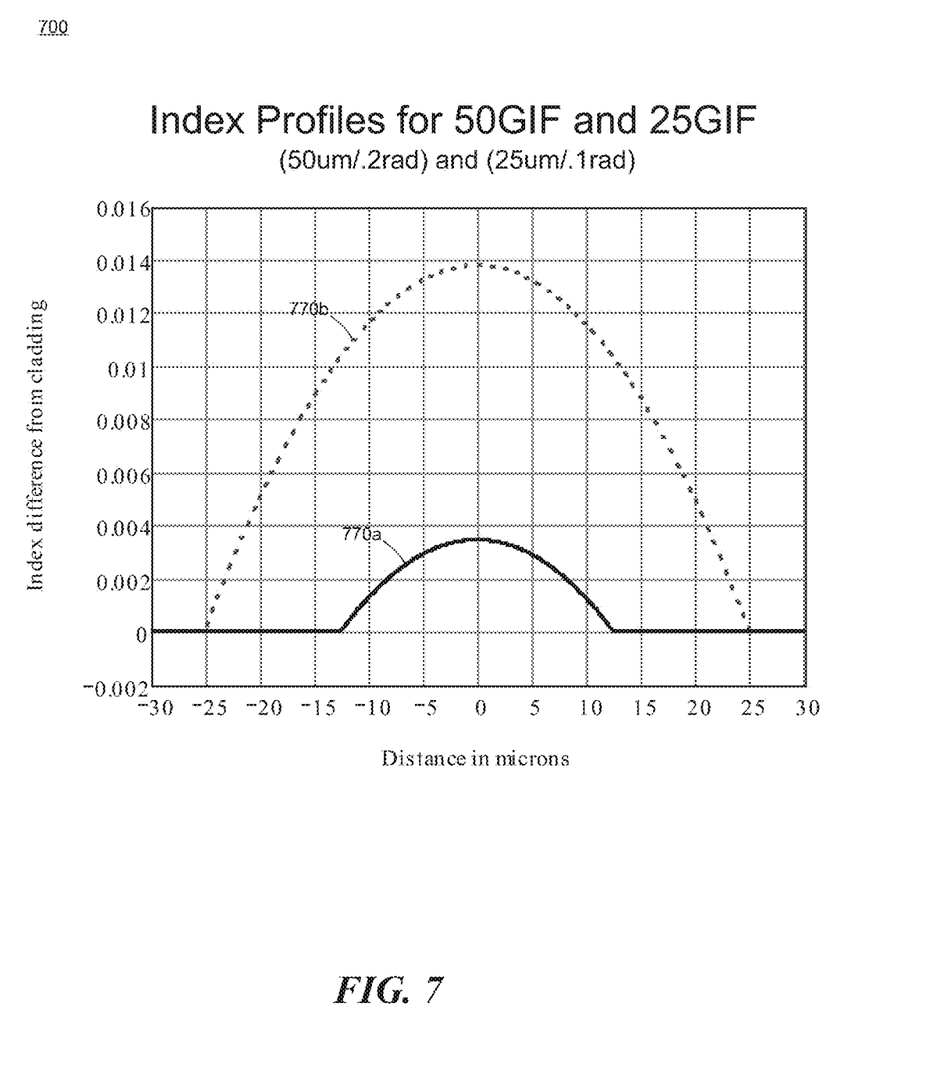
FIG. 7 is a chart of index profile difference from cladding as a function of distance of a multi-mode fiber according to an example.

FIG. 7 is a chart 700 of index profile difference from cladding as a function of distance of a multi-mode fiber according to an example. Distances are relative to a center of the core of the fiber. The solid inner curve, fiber index 770a, corresponds to a core having a radius of 12.5 microns (diameter of 25 microns). The dashed outer curve, fiber index 770b, corresponds to a core having a radius of 25 microns (diameter of 50 microns).

Figure 8:
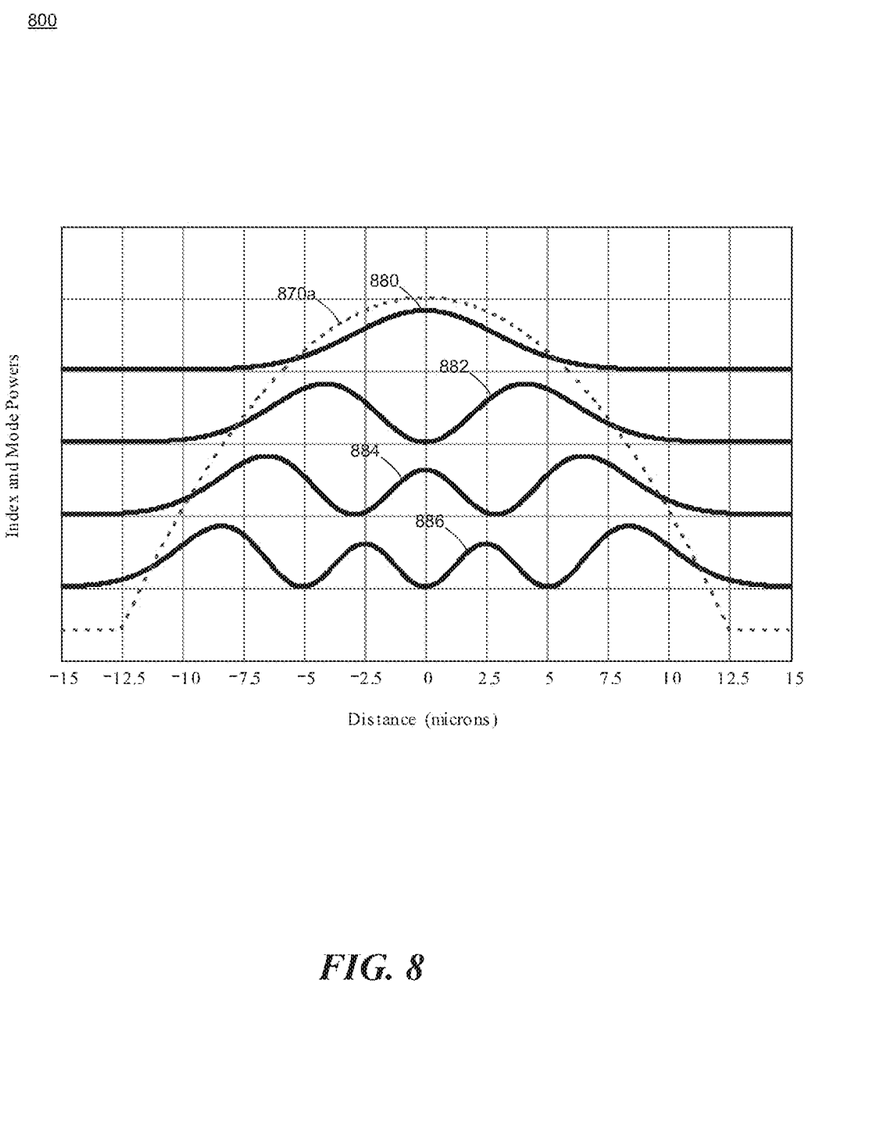
FIG. 8 is a chart of index and mode powers as a function of distance of a multi-mode fiber according to an example.

An index profile of a fiber may be optimized for three parameters that may be interrelated for optimization purposes: group velocity (a measure of the relative speeds at which the modes propagated by the fiber travel relative to each other), bending loss (losses affecting signal propagation associated with a bend in the fiber that causes loss of higher order modes), and material dispersion (loss caused by dispersion of the signal within the propagation medium of the fiber). The index profile of the fiber may be varied to optimize the set of fiber characteristics overall. As illustrated in the curves of FIGS. 7 and 8, the index profile may approximate a quadratic profile. The index profile may be optimized to trade-off between material dispersion and modal dispersion, to get minimize signal degradation and maximize a BitRate*Length product (BR*L product) that is proportional to BW*L.

A fiber, such as an example V-MMF associated with fiber index 770a, may use less Germanium doping in its core compared to a 50 GIF associated with fiber index 770b. Less Germanium doping is used in example fibers to achieve the lower concentration peak associated with fiber index 770a, and fiber index 770a has a lower diameter/area compared to fibers associated with fiber index 770b. Thus, an overall amount of doping, i.e., the amount calculated by the product of peak fiber index and fiber diameter, is much less for fiber index 770a. Accordingly, an example V-MMF associated with fiber index 770a can be manufactured more economically than a 50 GIF associated with fiber index 770b, due to requiring less Germanium doping in the core than 50 GIF fiber.

FIG. 8 is a chart 800 of index and mode powers as a function of distance of a multi-mode fiber according to an example. The dashed curve corresponds to index profile values, i.e., fiber index 870a. The solid curves correspond to mode powers, i.e., first mode 880, second mode 882, third mode 884, and fourth mode 886.

The solid curves of first mode 880, second mode 882, third mode 884, and fourth mode 886 illustrate the shapes of the four lowest Hermite-Gaussian modes that fit inside the dashed curve of the fiber index 870a. Each mode travels through the fiber and is limited in the transverse dimension where that mode decays, indicated by a tail edge of the solid curve reaching the dashed fiber index 870a curve. Each mode is related to a width of the dashed fiber index 870a curve, as each mode travels at a different effective refractive index relative to a peak index. The propagated light decays outside the core, e.g., outside the dashed fiber index 870a curve where the fiber transitions into a fiber cladding surrounding the fiber. Each mode (first mode 880, second mode 882, third mode 884, and fourth mode 886) travels at a different effective refractive index, spaced equally in vertical steps.

The d*NA product (e.g., fiber and/or source) may be expressed as a function of modes as follows:

$$d * NA = \frac{2\lambda}{\pi} \times m_{max}$$

where $m_{max}$ is the maximum number of one dimensional Hermite-Gaussian modes, and $\lambda$ is wavelength.

Figure 9:
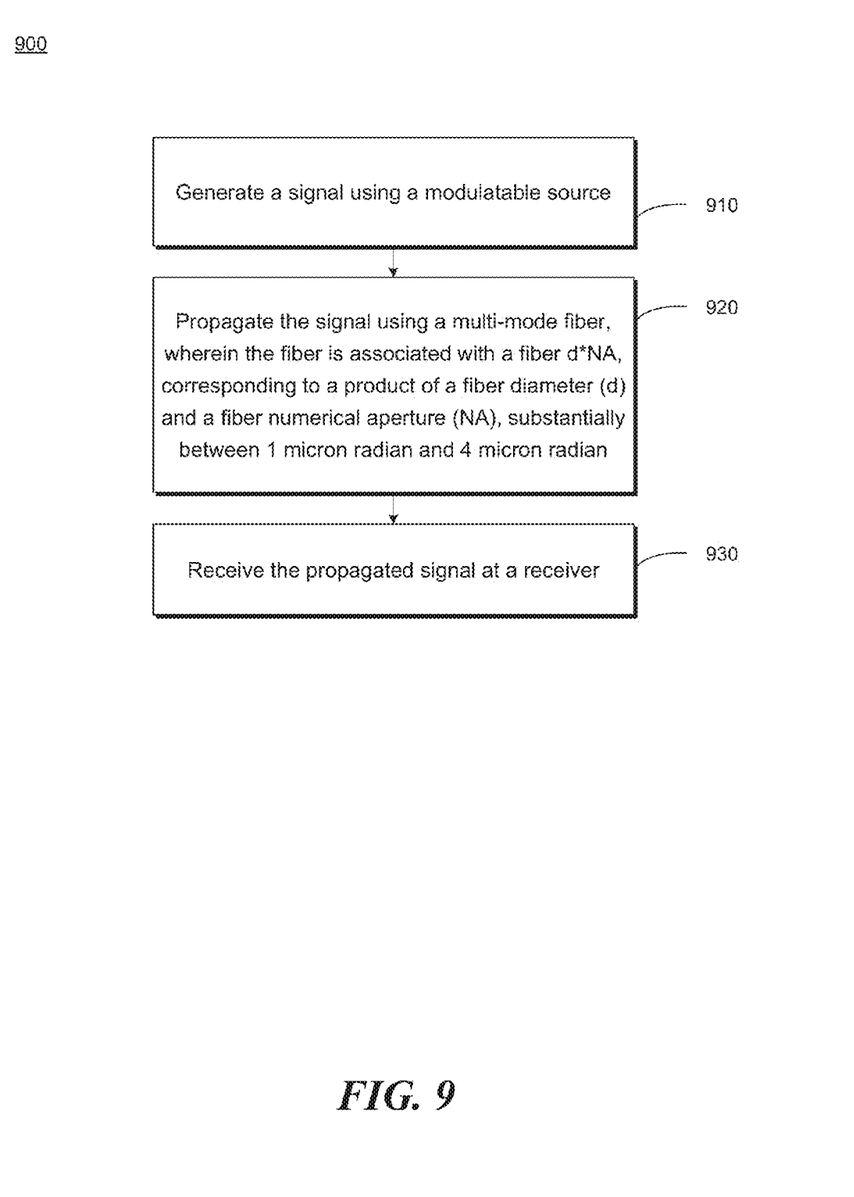
FIG. 9 is a flow chart based on propagating a signal using a multi-mode fiber according to an example.

FIG. 9 is a flow chart 900 based on propagating a signal using a multi-mode fiber according to an example. In step 910, a signal is generated using a modulatable source. For example, a VCSEL source is used to generate the signal. In step 920, the signal is propagated using a multi-mode fiber. The fiber is associated with a fiber d*NA, corresponding to a product of a fiber diameter (d) and a fiber numerical aperture (NA). The fiber d*NA is substantially between 1 micron radian and 4 micron radian. In step 930, the propagated signal is received at a receiver. For example, an optical receiver may receive and decode a modulated signal from the modulatable source.

The breadth and scope of the present invention should not be limited by any of the above-described examples, but should be defined in accordance with the following claims and their equivalents.

What is claimed is:

1. A system, comprising:
 a modulatable source to generate a signal;
 a multi-mode fiber to receive the signal from the modulatable source and to propagate the signal, wherein the fiber is associated with a fiber having a diameter d and far-field divergence angle associated with the propagated signal, corresponding to a product of a fiber diameter (d) and a fiber far-field divergence angle, the product substantially between 1 micron radian and 4 micron radian; and
 a receiver to receive the propagated signal from the multi-mode fiber.

2. The system of claim 1, wherein the source includes a Vertical Cavity Surface Emitting Laser (VCSEL).

3. The system of claim 1, wherein the fiber is a Graded-Index Fiber (GIF).

4. The system of claim 1, wherein the fiber is to extend a BW*L characteristic of the fiber, corresponding to a product of fiber bandwidth (BW) and fiber length (L), based on a balance of modal dispersion, material dispersion, and bending loss associated with a refractive index profile of the fiber.

5. The system of claim 1, further comprising an optical component to optically manipulate the propagated signal prior to being received by the receiver.

6. A method, comprising:
 generating a signal using a modulatable source;
 propagating the signal using a multi-mode fiber to receive the signal from the modulatable source, wherein the fiber is associated with a fiber having a diameter d and far-field divergence angle associated with the propagated signal, corresponding to a product of a fiber diameter (d) and a fiber far-field divergence angle, the product substantially between 1 micron radian and 4 micron radian; and
 receiving, from the multi-mode fiber, the propagated signal a receiver.

7. The method of claim 6, further comprising propagating the generated signal at a data rate substantially equal to or greater than 10 gigabits per second (Gbps).

8. The method of claim 6, further comprising optically manipulating the signal based on a zigzag optical component.

9. The method of claim 6, wherein the fiber d*far-field divergence angle is based on a fiber diameter substantially equal to 25 microns and a far-field divergence angle substantially equal to 0.1 radian.

10. The method of claim 6, wherein the fiber d* far-field divergence angle is substantially between 1.5 micron radian and 3 micron radian.

11. A system, comprising:
 a modulatable Vertical Cavity Surface Emitting Laser (VCSEL) source to generate a signal;
 a multi-mode fiber to receive the signal from the VCSEL source and to propagate the signal, wherein the fiber is associated with a fiber having a diameter d and far-field divergence angle associated with the propagated signal, corresponding to a product of a fiber diameter (d) and a fiber far-field divergence angle, the product substantially between 1 micron radian and 4 micron radian; and
 a receiver to receive the propagated signal from the multi-mode fiber.

12. The system of claim 11, further comprising an array-based fiber connector to connect the multi-mode fiber to propagate the signal, wherein the array-based fiber connector is to connect to a plurality of multi-mode fibers associated with the fiber d*far-field divergence angle.

13. The system of claim 11, wherein the fiber is to propagate a plurality of wavelengths based on Wavelength Division Multiplexing (WDM).

14. The system of claim 11, further comprising an air gap connector connect the fiber to propagate the signal.

15. The system of claim 11 wherein the fiber is utilized in a backplane of a computing system using an air gap connector.

* * * * *